United States Patent
Chun

(10) Patent No.: US 9,463,774 B2
(45) Date of Patent: Oct. 11, 2016

(54) SYSTEM AND METHOD OF DETECTING INTRUSION INTO VEHICLE

(71) Applicant: Hyundai Motor Company, Seoul (KR)

(72) Inventor: In Tae Chun, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/523,594

(22) Filed: Oct. 24, 2014

(65) Prior Publication Data

US 2015/0175126 A1 Jun. 25, 2015

(30) Foreign Application Priority Data

Dec. 23, 2013 (KR) ........................ 10-2013-0161720

(51) Int. Cl.
*B60R 25/10* (2013.01)

(52) U.S. Cl.
CPC ................. *B60R 25/1009* (2013.01)

(58) Field of Classification Search
CPC .......... B60R 25/1009; B60R 25/1004; G08B 13/2491; G08B 13/1618
USPC ........................ 340/426.24, 426.26, 552–554
See application file for complete search history.

(56) References Cited

U.S. PATENT DOCUMENTS 5,856,778 A * 1/1999 Kani ................... B60R 25/1009
340/426.26

FOREIGN PATENT DOCUMENTS

| JP | 2002-053011 A | 2/2002 |
| JP | 2006-123728 A | 5/2006 |
| KR | 10-1180797 B1 | 9/2012 |

* cited by examiner

*Primary Examiner* — Thomas Mullen

(74) *Attorney, Agent, or Firm* — Mintz Levin Cohn Ferris Glovsky and Popeo, P.C.; Peter F. Corless

(57) ABSTRACT

A system and a method of detecting an intrusion into a vehicle includes: a transmitter that transmits an ultrasonic wave signal into the vehicle when the system enters an intrusion-into-vehicle monitoring mode; a receiver that receives an ultrasonic wave signal reflected by an object inside the vehicle; and a controller that generates an intrusion warning when it is detected that a frequency level of the ultrasonic wave signal flowing in the receiver is changed, determines that a frequency synthesis is made to the ultrasonic wave signal by an external ultrasonic wave device when a changed frequency waveform having a predetermined magnitude is continuously received by the receiver, and defers generation of the intrusion warning.

13 Claims, 3 Drawing Sheets

SYSTEM AND METHOD OF DETECTING INTRUSION INTO VEHICLE

CROSS-REFERENCE TO RELATED APPLICATION

This application claims under 35 U.S.C. §119(a) priority to and the benefit of Korean Patent Application No. 10-2013-0161720 filed in the Korean Intellectual Property Office on Dec. 23, 2013, the entire contents of which are incorporated herein by reference.

BACKGROUND (a) Field of the Invention

The present invention relates to a system and a method of detecting an intrusion into a vehicle, and more particularly, to a system and a method which prevent an erroneous warning from being generated due to inflow of external ultrasonic waves.

(b) Description of the Related Art

In general, a system for detecting an intrusion into a vehicle irradiates an inside of the vehicle with ultrasonic waves through a transmission terminal, changes the amount of ultrasonic waves flowing into a reception terminal to an electrical signal, and analyzes and detects a signal level.

The system detects scattering of ultrasonic waves due to an intruder and a movement of an object in a case where an intrusion into the vehicle is generated, and generates a warning.

In the meantime, the system is mainly operated in a state where a door is locked when the vehicle is not driven, and in a case where all of the windows of the vehicle are closed during an operation of monitoring an intrusion, the system is not influenced from the outside or a level of influence from the outside is slight.

However, in a case where the system is operated in a state where all of the windows are opened, an ultrasonic wave component flows in from the outside, so that a waveform received inside is changed, and thus an erroneous warning is frequently generated even though the intrusion is not an actual intrusion.

For example, in a case where two vehicles each having such a system are closely parked in parallel, and then the system is operated in a state where a window is opened, the two vehicles are mutually influenced, so that an erroneous warning is generated.

Accordingly, it would be desirable to provide a method of reducing generation of an erroneous warning by an ultrasonic wave component input from the outside in the system for detecting an intrusion into a vehicle.

The above information disclosed in this Background section is only for enhancement of understanding of the background of the invention and therefore it may contain information that does not form the prior art that is already known in this country to a person of ordinary skill in the art.

SUMMARY

The present invention is directed to a system and a method of detecting an intrusion into a vehicle capable of reducing generation of an erroneous warning by determining whether a frequency synthesis is made to an ultrasonic wave signal by an ultrasonic wave device outside the vehicle and verifying the determination again during an operation of the system for detecting an intrusion into the vehicle.

An exemplary embodiment of the present invention provides a system for detecting an intrusion into a vehicle, including: a transmitter configured to transmit an ultrasonic wave signal into the vehicle when the system enters an intrusion-into-vehicle monitoring mode; a receiver configured to receive an ultrasonic wave signal reflected by an object inside the vehicle; and a controller configured to generate an intrusion warning when it is detected that a frequency level of the ultrasonic wave signal flowing in the receiver is changed, and determine that a frequency synthesis is made to the ultrasonic wave signal by an external ultrasonic wave device when a changed frequency waveform having a predetermined magnitude is continuously received by the receiver, and defer generation of the intrusion warning.

Further, the system for detecting an intrusion into a vehicle may further include: a transmission processor configured to amplify the ultrasonic wave signal received according to a command of the controller and transmit the amplified ultrasonic wave signal to the transmitter; and a reception processor configured to process the ultrasonic wave signal flowing in from the receiver through an amplification circuit and a filter, and transmit the processed ultrasonic wave signal to the controller.

Further, the controller may determine that the frequency synthesis is made to the ultrasonic wave signal by the external ultrasonic wave device, and then determine whether to generate the intrusion warning by verifying whether the frequency is synthesized.

Further, the controller may stop the transmission of the ultrasonic wave signal by controlling the transmitter, determine whether the ultrasonic wave signal is received by the receiver, and verify that the frequency is synthesized when the ultrasonic wave signal is received, and generate no intrusion warning.

Further, when the frequency level received by the receiver is changed by resuming the transmission of the ultrasonic wave signal after stopping the transmission of the ultrasonic wave signal, the controller may finally determine that the frequency level is changed by the synthesis of the frequency and generate no intrusion warning. Further, the controller may set a stop time of the ultrasonic wave signal to 500 ms for real-time monitoring of an intrusion situation.

In the meantime, another exemplary embodiment of the present invention provides a method of detecting an intrusion into a vehicle, including: a) transmitting, by a transmitter, an ultrasonic wave signal into the vehicle when a system for detecting the intrusion into the vehicle enters an intrusion-into-vehicle monitoring mode, and receiving an ultrasonic wave signal reflected by an object inside the vehicle through a receiver; b) determining, by a receiver, a frequency synthesis is made to the ultrasonic wave signal by an external ultrasonic wave device when it is detected that a changed frequency waveform having a predetermined magnitude is continuously received, and deferring determination of the intrusion warning; c) stopping transmission of the ultrasonic wave signal by controlling the transmitter, and determining whether the ultrasonic wave signal is received by the receiver; and d) determining that the frequency is synthesized when the ultrasonic wave signal is received by the receiver, and generating no intrusion warning.

Further, step b) may include changing the amount of ultrasonic waves flowing in through the receiver to an electrical signal, analyzing a frequency level of the changed signal, and detecting whether the frequency level is changed.

Further, step b) may include generating the intrusion warning when it is confirmed that a magnitude of a frequency waveform of the ultrasonic waves received by the receiver is irregularly changed.

Further, step d) may include determining that the frequency is not synthesized when the ultrasonic wave signal is not received by the receiver, and generating the intrusion warning.

Further, after step d), the method may further include finally determining that the frequency level is changed by the synthesis of the frequency when the frequency level received by the receiver is changed by resuming the transmission of the ultrasonic wave signal, and generating no intrusion warning.

Further, after step d), the method may further include finally determining that the frequency level is not changed by the synthesis of the frequency when the frequency level received by the receiver is not changed by resuming the transmission of the ultrasonic wave signal, and generating the intrusion warning.

According to the exemplary embodiment of the present invention, it is possible to reduce generation of an erroneous warning by determining whether a frequency synthesis is made to the ultrasonic wave signal by an external ultrasonic wave device during an operation of the system for detecting an intrusion into a vehicle.

Further, it is possible to improve stability and marketability by performing an additional logic of verifying again whether the frequency is synthesized.

Further, a current system logic may be improved and applied without configuring additional hardware, thereby decreasing costs compared to performance improvement.

DETAILED DESCRIPTION OF THE EMBODIMENTS

Figure 1:
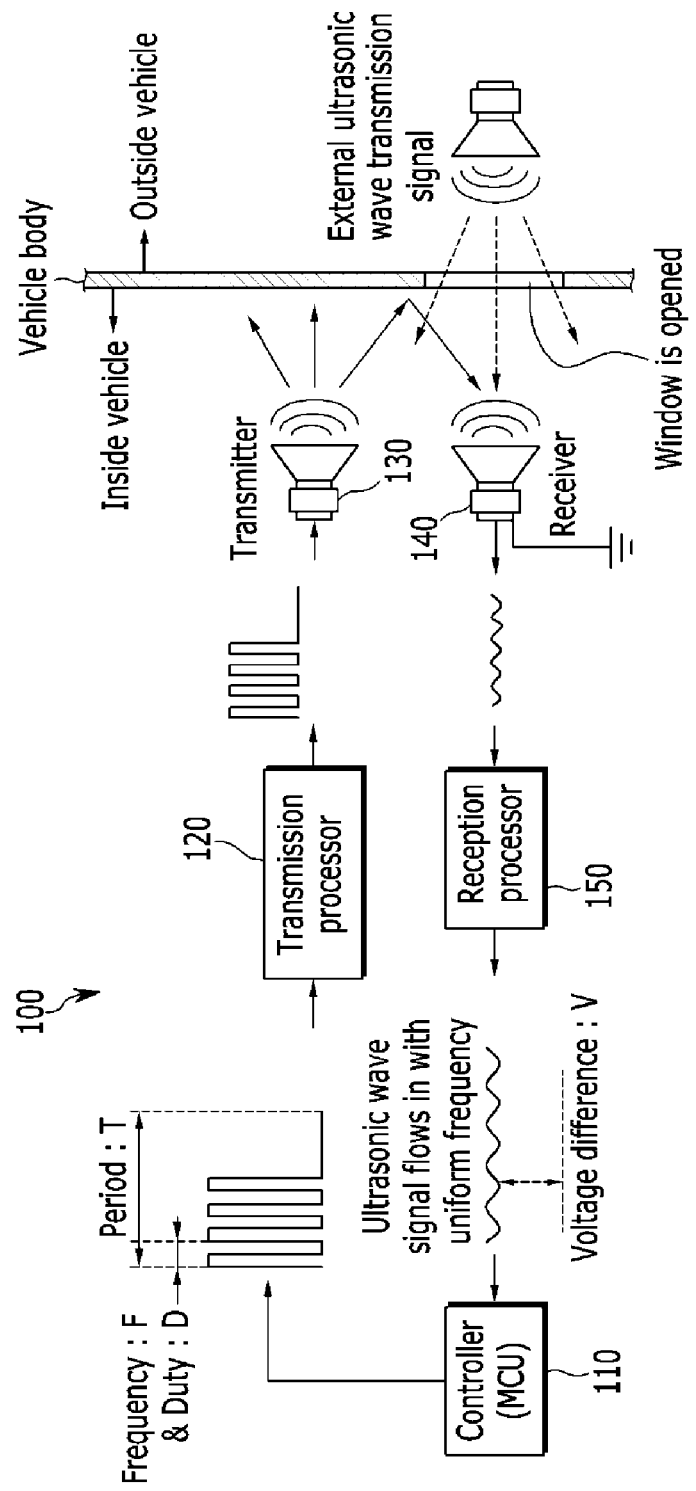
FIG. 1 is a diagram illustrating a configuration of a system for detecting an intrusion into a vehicle according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In addition, the terms "-er", "-or" and "module" described in the specification mean units for processing at least one function and operation and can be implemented by hardware components or software components and combinations thereof.

Hereinafter, a system and a method of detecting an intrusion into a vehicle according to an exemplary embodiment of the present invention will be described in detail with reference to the accompanying drawings.

FIG. 1 is a diagram illustrating a configuration of a system for detecting an intrusion into a vehicle according to an exemplary embodiment of the present invention.

Referring to accompanying FIG. 1, a system 100 for detecting an intrusion into a vehicle includes a controller 110, a transmission processor 120, a transmitter 130, a receiver 140, and a reception processor 150.

When the system enters an intrusion-into-vehicle detecting mode in a state where doors of the vehicle are locked, the controller 110 generates a transmission ultrasonic wave signal in a predetermined period for transmitting ultrasonic waves.

The transmission processor 120 amplifies an ultrasonic wave signal received according to a command of the controller 110.

The transmitter 130 transmits the ultrasonic wave signal amplified by the transmission processor 120 into the vehicle.

The receiver 140 receives an ultrasonic wave signal reflected by an object inside the vehicle.

The reception processor 150 processes the ultrasonic wave signal flowing in from the receiver 140 through a predetermined amplification circuit and a predetermined filter, and transmits the processed ultrasonic wave signal to the controller 110.

The controller 110 changes the amount of ultrasonic waves flowing in from the receiver 140 to an electrical signal, analyzes a frequency level of the changed signal, and detects a change in the frequency level, and when the frequency level is changed exceeding a predetermined reference value, an intrusion warning is generated.

In particular, when a moving object is present inside the vehicle, the controller 110 may recognize that a waveform change is generated by a Doppler effect due to the movement, and when a waveform change exceeding the predetermined reference value is generated, the controller 110 generates the intrusion warning.

Particularly, the controller 110 according to the exemplary embodiment of the present invention is characterized in that when the changed frequency waveform with a predetermined magnitude is continuously received by the receiver 140, the controller 110 determines that the frequency synthesis is made to the ultrasonic wave signal by an external ultrasonic wave device, and defers generation of the intrusion warning, thereby suppressing generation of an erroneous warning.

A characteristic of suppressing generation of the erroneous warning will be described in more detail through a description below.

Figure 2:
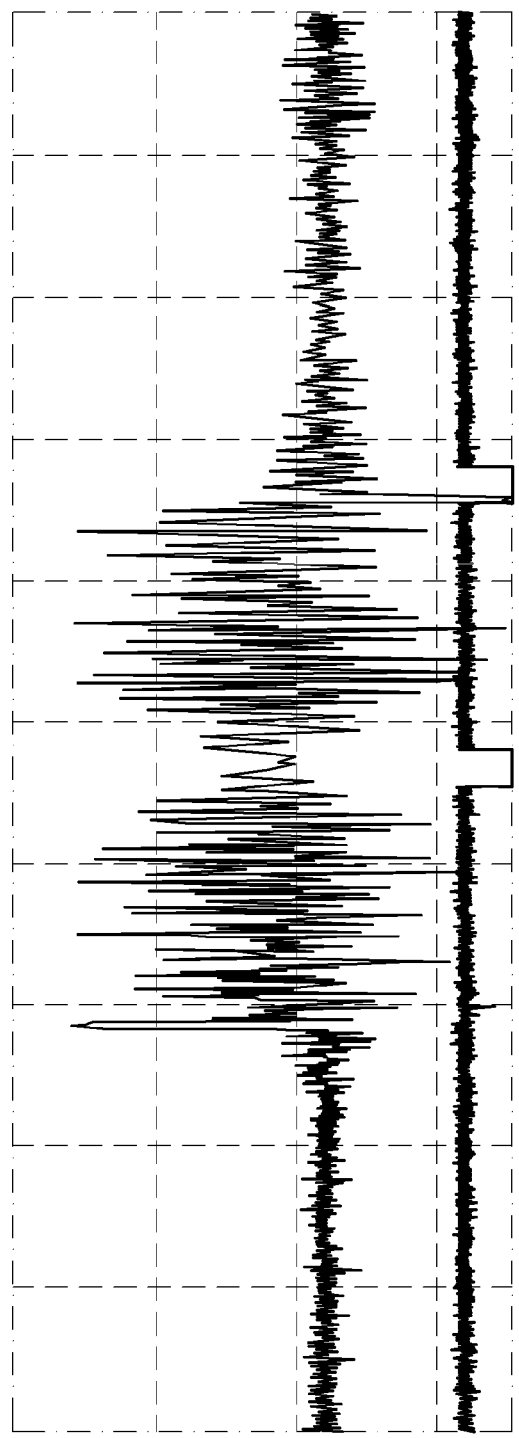
FIG. 2 is a view illustrating a waveform change when intrusion into a vehicle is generated according to the exemplary embodiment of the present invention.

First, FIG. 2 illustrates a waveform change when intrusion into the vehicle is generated according to the exemplary embodiment of the present invention.

Referring to accompanying FIG. 2, when actual intrusion into the vehicle is generated, a waveform is generated in various forms, not a uniform form, and a pitch of a received waveform is very irregularly generated.

Accordingly, the controller 110 may recognize a sudden and large change, or an irregular change in the waveform of the ultrasonic wave signal, and generate the intrusion warning.

In the meantime, when the window of the vehicle is opened as illustrated in FIG. 1 in a state where the intrusion-into-vehicle detection is operated, an ultrasonic wave signal may flow in from the outside through an open space.

For example, an external ultrasonic wave signal according to an intrusion detecting operation of a vehicle, which is adjacently parked to the vehicle, may flow in the vehicle. Alternatively, an external ultrasonic wave signal irradiated from an external ultrasonic wave device installed at a surrounding facility, in addition to the vehicle, may flow in the vehicle.

In this case, the actual intrusion is not generated in the vehicle, but the external ultrasonic wave signal is synthesized with the ultrasonic wave signal in the vehicle and flows in the receiver, so that the change in the frequency waveform is continuously detected, and there is a problem in that an erroneous warning is generated according to the continuous detection of the change in the frequency waveform.

In order to solve the problem, even though a predetermined change in the frequency waveform is generated, when the waveform having a predetermined magnitude is continuously received, the controller 110 according to the exemplary embodiment of the present invention determines that the continuous reception of the waveform having the predetermined magnitude is caused by an external ultrasonic wave signal.

In general, the ultrasonic wave device performs the transmission with a uniform frequency magnitude, so that even though the uniform ultrasonic wave frequency flowing in from the external ultrasonic wave device is synthesized with the uniform ultrasonic wave signal within the vehicle, a waveform having a uniform magnitude is formed.

Accordingly, even though the change in the waveform of the frequency received within the vehicle is generated by the synthesis of the external ultrasonic wave signal, the controller 110 may form the uniform waveform, and discriminate the uniform waveform from the received waveform, of which a pitch is very irregularly generated as illustrated in FIG. 2, and thus, the intrusion warning is prevented from being generated when the synthesized frequency is determined, thereby preventing an erroneous warning.

However, considering system performance, in the present invention, it is possible that a uniform waveform flows in due to generation of an actual intrusion of an intruder at a predetermined speed and in a predetermined direction, where such an actual intrusion is not excludable.

Accordingly, in order to improve stability and performance of the system, the present invention suggests an additional supplementing logic of discriminating an actual intrusion situation from an intrusion situation due to influence of an external ultrasonic wave signal below.

Figure 3:
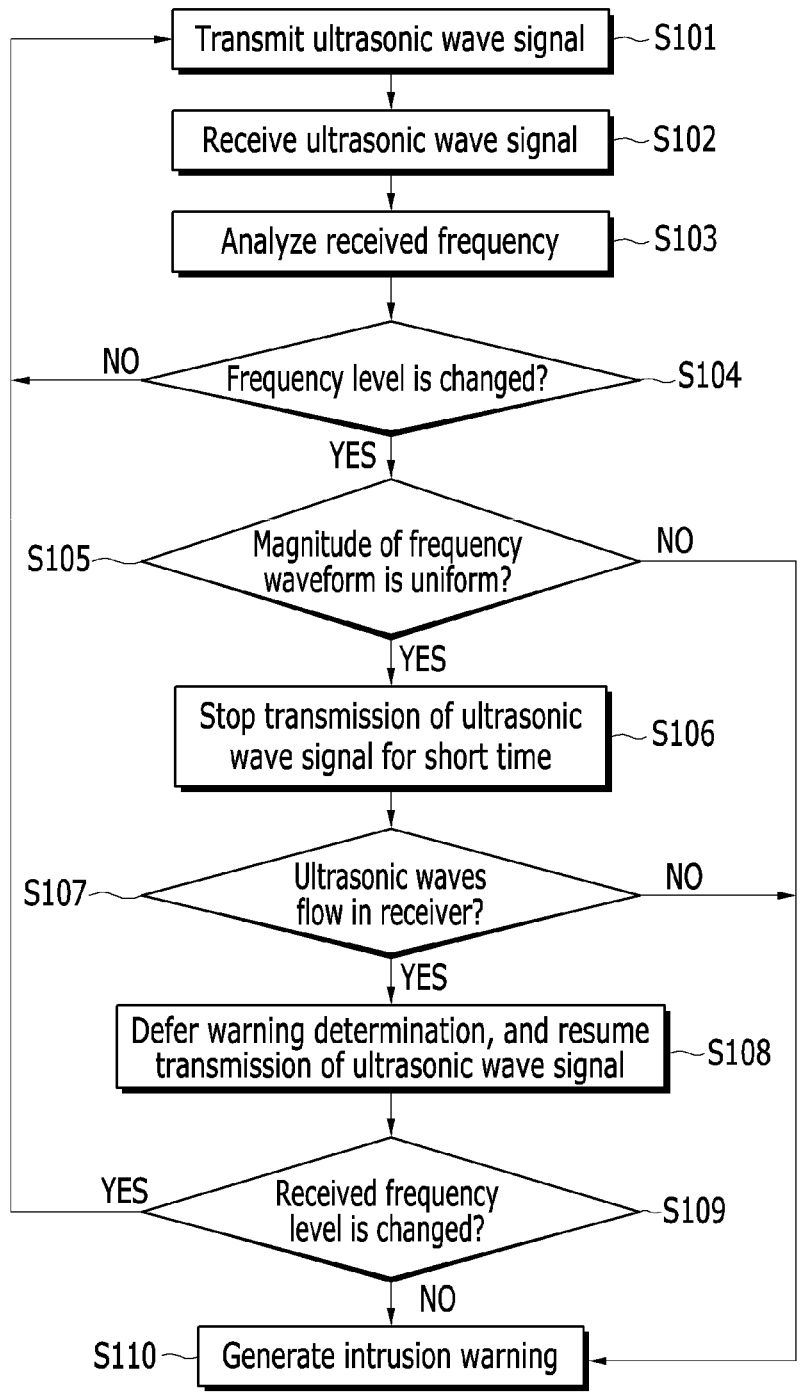
FIG. 3 is a flowchart illustrating a method of detecting an intrusion into a vehicle for preventing erroneous detection by using an external ultrasonic wave signal according to an exemplary embodiment of the present invention.

In the meantime, FIG. 3 is a flowchart illustrating a method of detecting an intrusion into a vehicle for preventing erroneous detection according to an external ultrasonic wave signal according to an exemplary embodiment of the present invention.

Referring to FIG. 3, when the system 100 for detecting an intrusion into a vehicle enters the intrusion-into-vehicle detection mode, the system 100 transmits an ultrasonic wave signal into the vehicle through the transmitter 130 (S101).

The system 100 for detecting an intrusion into the vehicle receives the ultrasonic wave signal reflected by an object inside the vehicle through the receiver 140 (S102).

The system 100 for detecting an intrusion into the vehicle changes the amount of ultrasonic waves flowing in through the receiver 140 to an electrical signal, analyzes a frequency level of the change signal, and detects whether the frequency level is changed (S103).

Further, when the frequency level is not changed (S104, NO), the system 100 for detecting an intrusion into the vehicle repeats the processes of transmitting and receiving the ultrasonic waves.

However, when the frequency level is changed exceeding a reference value (S104, YES), the system 100 for detecting an intrusion into the vehicle determines whether a magnitude of a frequency waveform is uniform in order to determine whether the change in the frequency level resulted from synthesis of the ultrasonic wave signal flowing in from the outside (S105).

In this case, when it is confirmed that the magnitude of the frequency waveform is not uniform and is irregular, as illustrated in FIG. 2 (S105, NO), the system 100 for detecting an intrusion into the vehicle generates an intrusion warning (S110).

However, when it is determined that the magnitude of the frequency waveform is uniform (S105, YES), the system 100 for detecting an intrusion into the vehicle determines that the uniform magnitude of the frequency waveform is caused by an external ultrasonic wave signal, and performs an additional supplementing logic below in order to verify the influence of the external ultrasonic wave signal.

In particular, a process of verifying whether the change in the magnitude of the frequency waveform to have a predetermined magnitude is measured due to the synthesis of the signal transmitted from the outside will be subsequently described below.

[First Verification]

The system 100 for detecting an intrusion into the vehicle stops (Off) the transmission of the ultrasonic wave signal for a short time by controlling the transmitter 130 (S106).

In this case, a transmission stop time of the ultrasonic wave signal is made short, approximately 500 ms, to allow for real-time detection of the intrusion situation.

In this case, the system 100 for detecting an intrusion into the vehicle checks whether the ultrasonic wave signal is received by the receiver 140, and when the ultrasonic wave signal does not flow in the receiver 140 due to stopping the transmission of the ultrasonic wave signal (S107, NO), the system 100 for detecting an intrusion into the vehicle determines that the synthesis is not made, and generates the intrusion warning (S110). That is, the system 100 for detecting an intrusion into the vehicle determines that the change in the magnitude of the frequency waveform did not result from the synthesis.

In the meantime, when the ultrasonic wave signal flows in the receiver 140 even though the transmission of the ultrasonic wave signal is stopped (S107, YES), the system 100 for detecting an intrusion into the vehicle defers the determination of the intrusion warning, and resumes the transmission of the ultrasonic wave signal (S108).

[Second Verification]

When a frequency level received after resuming the transmission of the ultrasonic wave signal is changed exceeds a predetermined reference value (S109, YES), the system 100 for detecting an intrusion into the vehicle finally determines that the ultrasonic wave signal is synthesized with the external ultrasonic wave signal, and the process returns to step S101.

In the meantime, when the frequency level received after resuming the transmission of the ultrasonic wave signal is not changed (S109, NO), the system 100 for detecting an intrusion into the vehicle finally determines that the change did not result from the synthesis of the ultrasonic wave frequency, and generates the intrusion warning (S110).

As described above, according to the exemplary embodiment of the present invention, it is possible to reduce generation of an erroneous warning by determining whether a frequency synthesis is made to the ultrasonic wave signal by an external ultrasonic wave device during the operation of the system for detecting an intrusion into the vehicle.

Further, it is possible to improve stability and marketability by performing the additional logic of verifying whether the frequency is synthesized considering various situations.

Further, the current system logic can be carried out without requiring additional hardware, thereby decreasing costs compared to performance improvement.

The exemplary embodiment of the present invention is not implemented only by the aforementioned apparatus and/or method, and may be implemented by a program for implementing a function corresponding to the configuration of the exemplary embodiment of the present invention, a recording medium in which the program is recorded, and the like, and the implementation may be easily made from the description of the aforementioned exemplary embodiment by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for detecting an intrusion into a vehicle, comprising:
    a transmitter configured to transmit an ultrasonic wave signal into the vehicle;
    a receiver configured to receive the ultrasonic wave signal reflected by an object inside the vehicle; and
    a controller configured to, in the course of generating an intrusion warning when it is detected that a level of the ultrasonic wave signal flowing in the receiver is changed at one or more frequencies of the signal, determine that a frequency synthesis is made to the ultrasonic wave signal by an external ultrasonic wave device when a waveform of the changed level is continuously received by the receiver, and defer generation of the intrusion warning when the frequency synthesis is determined.

2. The system of claim 1, further comprising:
a transmission processor configured to amplify the ultrasonic wave signal received according to a command of the controller and transmit the amplified ultrasonic wave signal to the transmitter; and
a reception processor configured to process the ultrasonic wave signal flowing in from the receiver through an amplification circuit and a filter, and transmit the processed ultrasonic wave signal to the controller.

3. The system of claim 1, wherein:
when the controller determines that the frequency synthesis is made to the ultrasonic wave signal by the external ultrasonic wave device, the controller determines whether to generate the intrusion warning by verifying whether the frequency synthesis is made to the ultrasonic wave signal.

4. The system of claim 3, wherein, in the verifying of whether the frequency synthesis is made to the ultrasonic wave signal,
the controller stops the transmission of the ultrasonic wave signal by controlling the transmitter, verifies that the frequency synthesis is made to the ultrasonic wave signal when the waveform of the changed level is received by the receiver after stopping the transmission of the ultrasonic wave signal, and generates no intrusion warning when the frequency synthesis is verified.

5. The system of claim 4, wherein:
when the waveform of the changed level is received by the receiver by resuming the transmission of the ultrasonic wave signal after stopping the transmission of the ultrasonic wave signal, the controller finally determines that the level is changed by the frequency synthesis, and generates no intrusion warning.

6. The system of claim 4, wherein:
the controller sets a stop duration of the ultrasonic wave signal to 500 ms.

7. The system of claim 1, wherein:
the controller stops the transmission of the ultrasonic wave signal by controlling the transmitter, determines whether the ultrasonic wave signal is received by the receiver, and verifies that the frequency synthesis is made when the ultrasonic wave signal is received, and generates no intrusion warning.

8. A method of detecting an intrusion into a vehicle, comprising:
    a) transmitting, by a transmitter, an ultrasonic wave signal into the vehicle, and receiving, by a receiver, the ultrasonic wave signal reflected by an object inside the vehicle;
    b) determining that a frequency synthesis is made to the ultrasonic wave signal by an external ultrasonic wave device when it is detected that a level of the ultrasonic wave signal is changed at one or more frequencies of the signal and a waveform of the changed level is continuously received by the receiver, and deferring determination of an intrusion warning;
    c) stopping transmission of the ultrasonic wave signal by controlling the transmitter, and determining whether the waveform of the changed level is received by the receiver; and
    d) determining that the frequency synthesis is made to the ultrasonic wave signal when the waveform of the changed level is received by the receiver, and generating no intrusion warning.

9. The method of claim 8, wherein:
step b) includes converting an ultrasonic wave flowing in through the receiver to an electrical signal, analyzing a level of the electrical signal, and detecting whether the level is changed.

10. The method of claim 9, further comprising, after step d),
- determining that the level is changed by the frequency synthesis when the level received by the receiver is changed by resuming the transmission of the ultrasonic wave signal, and generating no intrusion warning.

11. The method of claim 10, further comprising, after step d),
- determining that the level is not changed by the frequency synthesis when the level received by the receiver is not changed by resuming the transmission of the ultrasonic wave signal, and generating the intrusion warning.

12. The method of claim 8, further comprising:
generating the intrusion warning when it is confirmed that a magnitude of a frequency waveform of the ultrasonic wave received by the receiver is irregularly changed.

13. The method of claim 8, further comprising:
determining that the frequency synthesis is not made and generating the intrusion warning, when the ultrasonic wave signal of the changed level is not received by the receiver at step c).

\* \* \* \* \*